(12) United States Patent
Wildhagen et al.

(10) Patent No.: US 12,465,682 B2
(45) Date of Patent: Nov. 11, 2025

(54) ELASTOMERIC MEMBRANE FOR A MEDICAL ELASTOMER PUMP, AND MEDICAL ELASTOMER PUMP HAVING SUCH ELASTOMERIC MEMBRANE

(71) Applicant: B. Braun Melsungen AG, Melsungen (DE)

(72) Inventors: Jens Wildhagen, Hannover (DE); Niklas Riemann, Alheim (DE)

(73) Assignee: B. Braun Melsungen AG, Melsungen (DE)

( * ) Notice: Subject to any disclaimer, the term of this patent is extended or adjusted under 35 U.S.C. 154(b) by 638 days.

(21) Appl. No.: 17/798,930

(22) PCT Filed: Jan. 25, 2021

(86) PCT No.: PCT/EP2021/051572
§ 371 (c)(1),
(2) Date: Aug. 11, 2022

(87) PCT Pub. No.: WO2021/164986
PCT Pub. Date: Aug. 26, 2021

(65) Prior Publication Data
US 2023/0069353 A1 Mar. 2, 2023

(30) Foreign Application Priority Data
Feb. 20, 2020 (DE) ...................... 10 2020 202 186.4

(51) Int. Cl.
*A61M 5/148* (2006.01)
(52) U.S. Cl.
CPC ................................. *A61M 5/148* (2013.01)

(58) Field of Classification Search
CPC ...... A61M 5/142; A61M 5/148; A61M 5/145; A61M 5/152; A61M 5/14593; A61M 5/16854; A61M 5/1408
See application file for complete search history.

(56) References Cited

U.S. PATENT DOCUMENTS

| | | | |
|---|---|---|---|
| 5,298,025 A | 3/1994 | Hessel et al. | |
| 5,368,570 A | 11/1994 | Thompson et al. | |

(Continued)

FOREIGN PATENT DOCUMENTS

| | | |
|---|---|---|
| CN | 204485050 U | 7/2015 |
| CN | 110694139 A | 1/2020 |

(Continued)

OTHER PUBLICATIONS

Search Report received in International Application No. PCT/EP2021/051572 dated May 3, 2021, with translation, 5 pages.

(Continued)

*Primary Examiner* — Imani N Hayman
(74) *Attorney, Agent, or Firm* — Christopher A. Rothe; CM Law

(57) ABSTRACT

A medical elastomer pump and an elastomeric membrane for use in infusion therapy. The elastomeric membrane forms a pump volume for receiving and delivering a medical fluid. In a filled state of the pump volume, in which the pump volume is filled at least in part with the medical fluid, the elastomeric membrane is resiliently stretched. The resiliently stretched elastomeric membrane applies a delivery pressure onto the pump volume for delivering the medical fluid. The elastomeric membrane has a plurality of bulge portions which, at least in the filled state, are convex, each forming a bulge. The bulges each form a pump volume portion of the pump volume.

15 Claims, 4 Drawing Sheets

(56) References Cited

U.S. PATENT DOCUMENTS

| | | | |
|---|---|---|---|
| 6,428,518 B1 * | 8/2002 | Brengle | ............... A61M 5/145 604/191 |
| 2018/0280610 A1 | 10/2018 | Stettner | |
| 2020/0016332 A1 | 1/2020 | Haslbeck et al. | |

FOREIGN PATENT DOCUMENTS

| | | |
|---|---|---|
| DE | 102017205251 A1 | 10/2018 |
| DE | 102018211140 A1 | 1/2020 |
| EP | 2812049 B1 | 11/2017 |
| EP | 3248633 B1 | 10/2018 |
| WO | 2017106408 A1 | 6/2017 |

OTHER PUBLICATIONS

Office Action received in Chinese Application No. 202180015762.7 dated May 30, 2025, with translation, 15 pages.

\* cited by examiner

ELASTOMERIC MEMBRANE FOR A MEDICAL ELASTOMER PUMP, AND MEDICAL ELASTOMER PUMP HAVING SUCH ELASTOMERIC MEMBRANE

CROSS-REFERENCE TO RELATED APPLICATIONS

This application is the national stage entry of International Application No. PCT/EP2021/051572, filed Jan. 25, 2021, and claims priority to German Application No. 10 2020 202 186.4, filed Feb. 20, 2020. The contents of International Application No. PCT/EP2021/051572 and German Application No. 10 2020 202 186.4 are incorporated by reference herein in their entireties.

FIELD

The invention relates to an elastomeric membrane for a medical elastomer pump for conveying a medical fluid, wherein the elastomeric membrane forms a pump volume for receiving and conveying the medical fluid and is elastically stretched in a filled state of the pump volume at least partially filled with the medical fluid, as a result of which the elastically stretched elastomeric membrane exerts a conveying pressure on the pump volume so as to convey the medical fluid. The invention also relates to a medical elastomer pump having such an elastomeric membrane.

BACKGROUND

Such a medical elastomer pump is known from DE 10 2017 205 251 A1 and is provided for administering a medical fluid to a patient in the context of an outpatient or inpatient infusion therapy. Such medical elastomer pumps may also be referred to as elastomeric infusion pumps. The known elastomer pump has an elastomeric membrane forming a pump volume that serves for receiving and conveying the medical fluid to be administered. In a filled state of the pump volume at least partially filled with the medical fluid, the elastomeric membrane is elastically stretched in the manner of a balloon and assumes an approximately spherical or oval form. The elastic stretching of the elastomeric membrane exerts a conveying pressure on the medical fluid located in the pump volume. Under the effect of the conveying pressure, the medical fluid is conveyable from the pump volume into a fluid line system downstream of the elastomeric membrane. A conveying rate of the medical fluid that is established here is dependent on the conveying pressure. Said conveying pressure is dependent on the elastic stretching of the elastomeric membrane, which in turn is dependent on the filled state of the pump volume and therefore on the fill amount of the medical fluid located in the elastomeric membrane. The filled-state-dependent conveying pressure gives rise to a conveying rate of the medical fluid that varies to across the filled state and therefore also the administration time. From a medical point of view, a conveying rate that is as constant as possible is desirable. Throttle elements in the form of pressure regulators or conveying-rate limiters are known in the prior art which are intended to stabilize the conveying rate across the filled state and are usually arranged downstream of the elastomeric membrane.

SUMMARY

It is an object of the invention to provide an elastomeric membrane and a medical elastomer pump of the type mentioned at the outset that enable a conveying rate that is as constant as possible.

This object is achieved for the elastomeric membrane by the elastomeric membrane having a plurality of bulge portions that, at least in the filled state, curve outward so as to each form a bulge, wherein the bulges each form a pump volume portion of the pump volume. It has been found that the solution according to the invention makes it possible to achieve reduced dependence of the conveying pressure on the filled state and therefore also on the conveying time. As a result, the medical fluid can be conveyed with a conveying rate that is as constant as possible, this being desirable from a medical point of view and conducive to patent safety. By way of the solution according to the invention, the pump volume is subdivided, so to speak, into a plurality of pump volume portions. The elastomeric membrane has the plurality of bulge portions for this purpose. The bulge portions each form, in the state of the elastomeric membrane at least partially filled with the medical fluid, one of the bulges. Said bulges in turn each form one of the pump volume portions of the pump volume. As a result, the solution according to the invention—expressed simply—achieves a kind of hydraulic parallel circuit of a plurality of pump volumes, namely the pump volume portions. The inventors have discovered that this kind of hydraulic parallel circuit makes it possible to achieve stabilization of the conveying pressure and therefore also of the conveying rate with simple means. The elastomeric membrane is elastically, preferably soft-elastically and/or rubber-elastically, stretchable in the manner of a balloon or a bubble. For this purpose, the elastomeric membrane is manufactured from at least one elastomeric material. Useful elastomeric materials are in particular silicone in the form of silicone rubber or silicone elastomer, rubber or the like. In the filled state at least partially filled with the medical fluid, the elastomeric membrane is elastically, preferably soft-elastically and/or rubber-elastically, stretched in the manner of a balloon or bubble and delimits the pump volume and the medical fluid accommodated therein. As a result of the bulge portions provided according to the invention, the elastomeric membrane—at least in the filled state—does not approximately assume a spherical, oval or ball-shaped form. Rather, the bulge portions each form one of the bulges. The bulges each curve outward, preferably in a rounded manner, and may in particular also be referred to as roundness, curvature, swelling, bulging or hump. The bulges may each curve outward in particular in the form of a spherical calotte. Accordingly, the elastomeric membrane—at least in the filled state—has a form that is rounded, curves outward, is swollen and/or is bulging at a plurality of locations, namely the bulges. The same may apply to an empty state of the elastomeric membrane not filled with the medical fluid. Alternatively, the bulges are not formed in the empty state and/or are formed in the empty state to a lesser extent. The bulge portions and therefore also the bulges are preferably arranged uniformly distributed over the surface of the elastomeric membrane. The bulge portions can have a uniform, preferably an identical, or non-uniform design.

In one configuration of the invention, the elastomeric membrane has locally different elastic stretch properties, wherein the elastomeric membrane is elastically stretchable comparatively more easily in the region of the bulge portions than away from the bulge portions. The comparatively easier elastic stretchability in the region of the bulge portions ensures that the elastomeric membrane, when filled with the medical fluid and/or in the filled state, roundly curves outward in a functionally correct and reliable manner in the region of the bulge portions and thus forms the bulges. The locally different elastic stretch properties can be achieved through the material and/or by appropriate dimensioning. By way of example, the elastomeric membrane can be manufactured from a first material in the region of the bulge portions and from a second material away from said bulge portions, wherein the first material has a lower modulus of elasticity in comparison to the second material. Alternatively or additionally, the entire elastomeric membrane can be manufactured from the same material, wherein said material can have a locally different degree of crosslinking. Further alternatively or additionally, the elastomeric membrane can be dimensioned so as to be weaker in the region of the bulge portions, so as to achieve comparatively easier elastic stretchability.

In a further configuration of the invention, the bulge portions have different elastic stretch properties, as a result of which the bulges are formed differently under the effect of the conveying pressure. As a result of the different elastic stretch properties, the bulge portions, in the filled state, roundly curve outward differently. The corresponding bulges form pump volume portions with different volume contents in this way. The inventors have discovered that such a design of the bulge portions with differences in the elastic stretch properties offers further advantages in respect of the constant-as-possible conveying rate of the medical fluid that is striven for. The different elastic stretch properties of the bulge portions can be achieved through the material and/or by appropriate dimensioning.

In a further configuration of the invention, the elastomeric membrane has locally different membrane thicknesses, wherein a first membrane thickness in the region of the bulge portions is comparatively smaller than a second membrane thickness away from the bulge portions. The first membrane thickness that is comparatively smaller in the region of the bulge portions ensures that the elastomeric membrane curves outward in a functionally correct manner under the effect of the medical fluid and forms the bulges. This is because the elastomeric membrane is elastically stretchable more easily in the region of the bulge portions than away from the bulge portions as a result of the comparatively smaller first membrane thickness. The comparatively greater second membrane thickness is provided away from the bulge portions. If the elastomeric membrane is produced by means of an injection-molding process, a material used here that serves for manufacturing the elastomeric membrane can be injected in a locally different amount and thus different membrane thicknesses can be formed. Alternatively or additionally, the elastomeric membrane can be machined in a material-removing manner so as to form the locally different membrane thicknesses.

In a further configuration of the invention, the bulge portions have different membrane thicknesses. This makes it possible to achieve different elastic stretch properties of the bulge portions. By way of example, a first bulge portion of the bulge portions can have the aforementioned first membrane thickness. A second bulge portion of the bulge portions can have a further, in particular third, membrane thickness that is comparatively smaller or greater with respect to the first membrane thickness. In respect of the formation of the different membrane thicknesses, reference is made to the disclosure relating to the previous configuration of the invention. The statements made there in this regard apply analogously in respect of this configuration of the invention.

In a further configuration of the invention, the elastomeric membrane is manufactured from at least one elastomeric material that is crosslinked to locally differing degrees, wherein a first degree of crosslinking in the region of the bulge portions is comparatively weaker than a second degree of crosslinking away from the bulge portions. The crosslinking to locally differing degrees of the at least one elastomeric material means that said material has locally different elastic stretch properties. Comparatively weak crosslinking is known to be associated with comparatively easy elastic stretchability and vice versa. The crosslinking to locally differing degrees can be achieved during manufacturing, for example by means of vulcanization to locally differing extents. The vulcanization can be achieved by means of methods known in principle for this purpose, especially sulfur vulcanization, vulcanization by means of peroxides, metal oxides or high-energy radiation.

In a further configuration of the invention, different degrees of crosslinking are provided in the region of the bulge portions. The different degrees of crosslinking make it possible to achieve different elastic stretch properties of the bulge portions. By way of example, a first bulge portion of the bulge portions can have the aforementioned first degree of crosslinking. A second bulge portion of the bulge portions can have a further, in particular third, degree of crosslinking that is comparatively weaker or stronger. Regarding the manufacturing-related measures for forming the different degrees of crosslinking, reference is made to the previous configuration of the invention. The statements made there in this regard apply analogously in the present case.

In a further configuration of the invention, the membrane has between 2 and 100, preferably between 7 and 40, particularly preferably between 15 and 25, bulge portions. A number between 2 and 100 bulge portions is advantageous practically for all possible applications and therefore also all possible sizes of the pump volume. A number between 7 and 40 bulge portions is comparatively preferred. This is because the maximum number of bulge portions is thereby comparatively lower, and so a comparatively simplified manufacture can be achieved while simultaneously maintaining an advantageous stabilization of the conveying rate. A number between 15 and 25 bulge portions is comparatively particularly preferred. This is because an optimum is thereby achieved, in particular with respect to, firstly, the stabilization of the conveying rate that is striven for and, secondly, a simplest possible design of the elastomeric membrane.

In a further configuration of the invention, a membrane thickness and/or locally different membrane thicknesses between 0.5 mm and 4 mm, preferably between 1.5 mm and 2.5 mm, particularly preferably between 1.7 mm and 1.9 mm, is/are provided. Virtually all practical applications are covered by the range between 0.5 mm and 4 mm. Preference is given to the range between 1.5 mm and 2.5 mm, since this can achieve, on the one hand, a saving in material by way of the comparative reduction in the maximum membrane thickness and, on the other hand at the same time, reliable outward curving of the bulge portions. The range between 1.7 mm and 1.9 mm has proven to be particularly advantageous in this regard.

In a further configuration of the invention, the elastomeric membrane has an at least single-layer membrane construction that has at least one first membrane layer manufactured from silicone. In particular, the silicone may be a silicone rubber or a silicone elastomer. The single-layer membrane construction enables a particularly simple and therefore cost-effective manufacture of the elastomeric membrane, thereby making it possible to save costs. Advantageous chemical properties of the elastomeric membrane can in particular be achieved through the use of silicone as first membrane layer.

In a further configuration of the invention, the elastomeric membrane has a multilayer membrane construction that has at least one second membrane layer manufactured from rubber. The multilayer membrane construction enables advantageous adaptability of the properties of the elastomeric membrane particularly in chemical and/or mechanical terms. The second membrane layer preferably dominates the mechanical properties of the elastomeric membrane. The chemical properties of the elastomeric membrane that are relevant to an interaction with the medical fluid are preferably dominated by the first membrane layer. Accordingly, the first membrane layer preferably faces the pump volume and is provided as radially inner layer. The second membrane layer is preferably arranged on the outside in the radial direction and further preferably directly on the first membrane layer. It is evident that further membrane layers can be provided.

The invention also relates to a membrane arrangement for a medical elastomer pump for conveying a medical fluid, having an elastomeric membrane as described above or of the type mentioned at the outset and having a stretch-resistant lattice structure that envelops the elastomeric membrane at least in certain portions, the elastomeric membrane being radially outwardly supported on the radially inner interior side of said lattice structure at least in the filled state, wherein the lattice structure has a plurality of lattice openings, through which the bulge portions, at least in the filled state, radially curve outward so as to each form one of the bulges. The lattice structure forms a kind of cover around the elastomeric membrane, wherein the elastomeric membrane—at least in the filled state partially filled with the medical fluid—curves radially outward through the plurality of lattice openings of the lattice structure. In contrast to the elastomeric membrane, the lattice structure is stretch-resistant. When the elastomeric membrane and therefore the pump volume is filled with the medical fluid, the elastomeric membrane is elastically stretched in the manner of a balloon in the above-described way and in this case certain portions of said elastomeric membrane are restrained by the stretch-resistant lattice structure. It is only in the region of the lattice openings that the elastic stretching of the membrane causes outward curving of the bulge portions so as to each form one of the bulges. The lattice openings of the lattice structure can be arranged with a regular or irregular distribution. In particular, the lattice openings can be round, oval or angular. The lattice structure can as such be dimensionally stable or dimensionally flexible and merely stretch-resistant. The bulge portions can be provided on the elastomeric membrane as such and/or only be formed by interaction with the lattice structure.

In a further configuration of the invention, the lattice openings are different. The elastic stretching of the membrane, together with the differently dimensioned lattice openings, correspondingly produces differently dimensioned bulge portions and ultimately pump volume portions with different volume contents. The inventors have discovered that such a design offers further advantages with respect to the constant-as-possible conveying rate of the medical fluid that is striven for.

In a further configuration of the invention, the lattice structure is a textile fabric, wherein the lattice openings are formed by meshes of the textile fabric. The textile fabric is preferably warp-knitted, woven, weft-knitted or knotted from a textile material. The textile fabric is particularly advantageously in the form of a net. The textile fabric is stretch-resistant under the effect of the elastomeric membrane. Designing the lattice structure as a textile fabric achieves a particularly compact membrane arrangement in an empty state of the elastomeric membrane. This is because the textile fabric is, as such, dimensionally flexible and can be folded up compactly together with the elastomeric membrane—not filled with the medical fluid—for packaging, transport and/or storage purposes.

The object underlying the invention is achieved for the medical elastomer pump mentioned at the outset by the provision of an elastomeric membrane as described above and/or a membrane arrangement as described above.

BRIEF DESCRIPTION OF THE DRAWING FIGURES

Further advantages and features of the invention will become apparent from the description that follows of preferred exemplary embodiments of the invention illustrated on the basis of the drawings.

DETAILED DESCRIPTION

Figure 1:
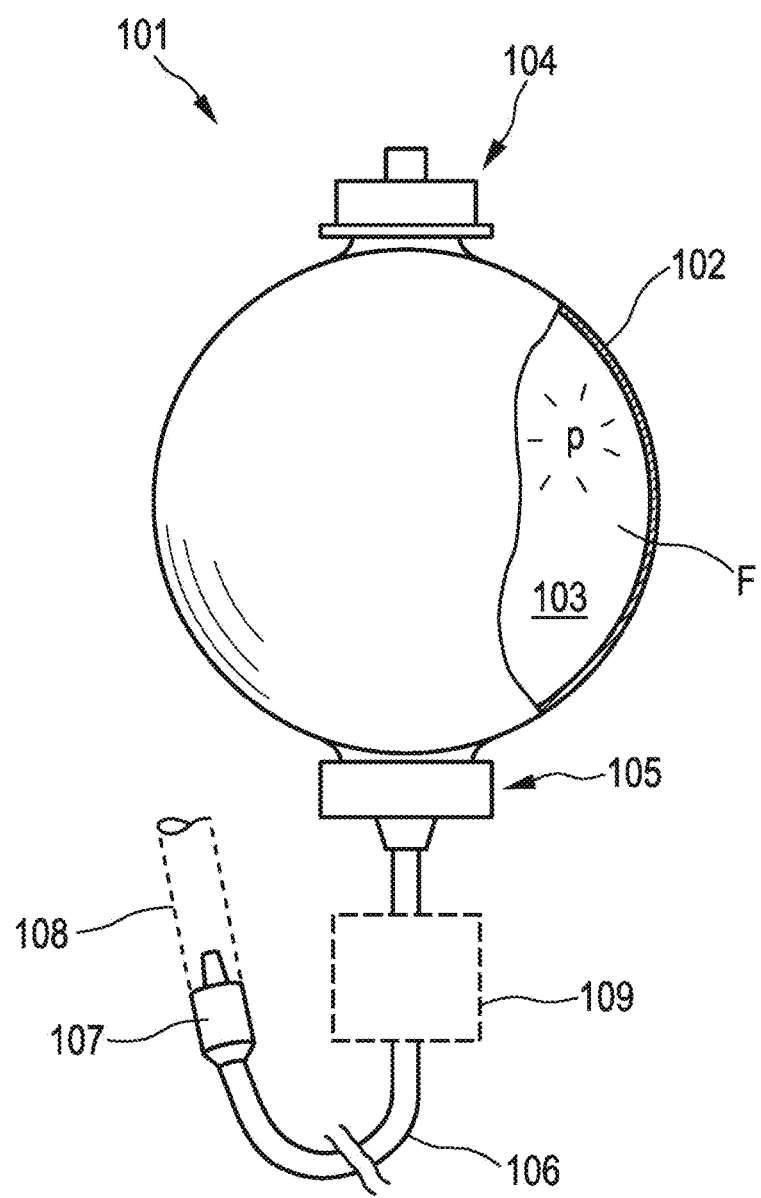
FIG. 1 shows a medical elastomer pump according to the prior art, provided with an elastomeric membrane designed according to the prior art and provided for conveying a medical fluid in the context of an infusion therapy.

FIG. 1 provides a medical elastomer pump 101 known from the prior art for conveying a medical fluid F in the context of an outpatient and/or inpatient infusion therapy. The medical elastomer pump 101 may also be referred to as elastomeric infusion pump. The medical elastomer pump 101 has an elastomeric membrane 102 forming a pump volume 103 for receiving and conveying the medical fluid F. In the configuration shown by means of FIG. 1, the pump volume 103 is shown in a filled state at least partially filled with the medical fluid F. In this filled state, the pump volume 103 and therefore also the elastomeric membrane 102 are elastically stretched in the manner of a balloon under the effect of the medical fluid F. The elastic stretching of the membrane 102 exerts a stretch-dependent—and therefore implicitly filled-state-dependent—conveying pressure p on the pump volume 103 and the medical fluid F accommodated therein. The elastomeric membrane 102 known from the prior art, at least in the filled state, has a form that curves outward evenly in a rounded manner, and that is approximately spherical in the present case. The same applies to the pump volume 103 delimited by the elastomeric membrane 102. To fill the pump volume 103 with the medical fluid F, the medical elastomer pump 101 has a reclosable filler neck 104 fluid-tightly connected to the elastomeric membrane 102 in a manner known in principle. To drain the medical fluid F out of the pump volume 103, the elastomer pump 101 has an outlet connector 105 firmly and fluid-tightly connected to the elastomeric membrane 102 in a manner known in principle. Downstream with respect to the pump volume 103, a hose line 106 is fluid-conductingly connected at one end to the outlet connector 105. At the other end, in a manner known in principle, the hose line 106 is provided with a fluid connector 107. In a ready-to-use state, the fluid connector 107 is fluid-conductingly connected, in a manner known in principle, to a patient-side patient access 108, indicated only with dashed lines by means of FIG. 1.

On account of the stretch-dependent and therefore filled-state-dependent conveying pressure p, a non-constant conveying rate of the medical fluid is naturally set between the pump volume 103 and the patient-side access 108. The conveying rate may also be referred to as volumetric flow rate and is variable over a conveying or administration period, during which the medical fluid F is conveyed out of the pump volume 103, on account of the stretch-dependent conveying pressure p. In the case of the elastomer pump 101 known from the prior art, a throttle element 109 is provided that is intended to stabilize the conveying rate over the conveying time. The throttle element 109 is indicated merely schematically by means of FIG. 1 and is assigned to the hose line 106 in a manner known in principle. The throttle element 109 can be, for example, in the form of a pressure regulator or of a flow-rate limiter.

Figure 2:
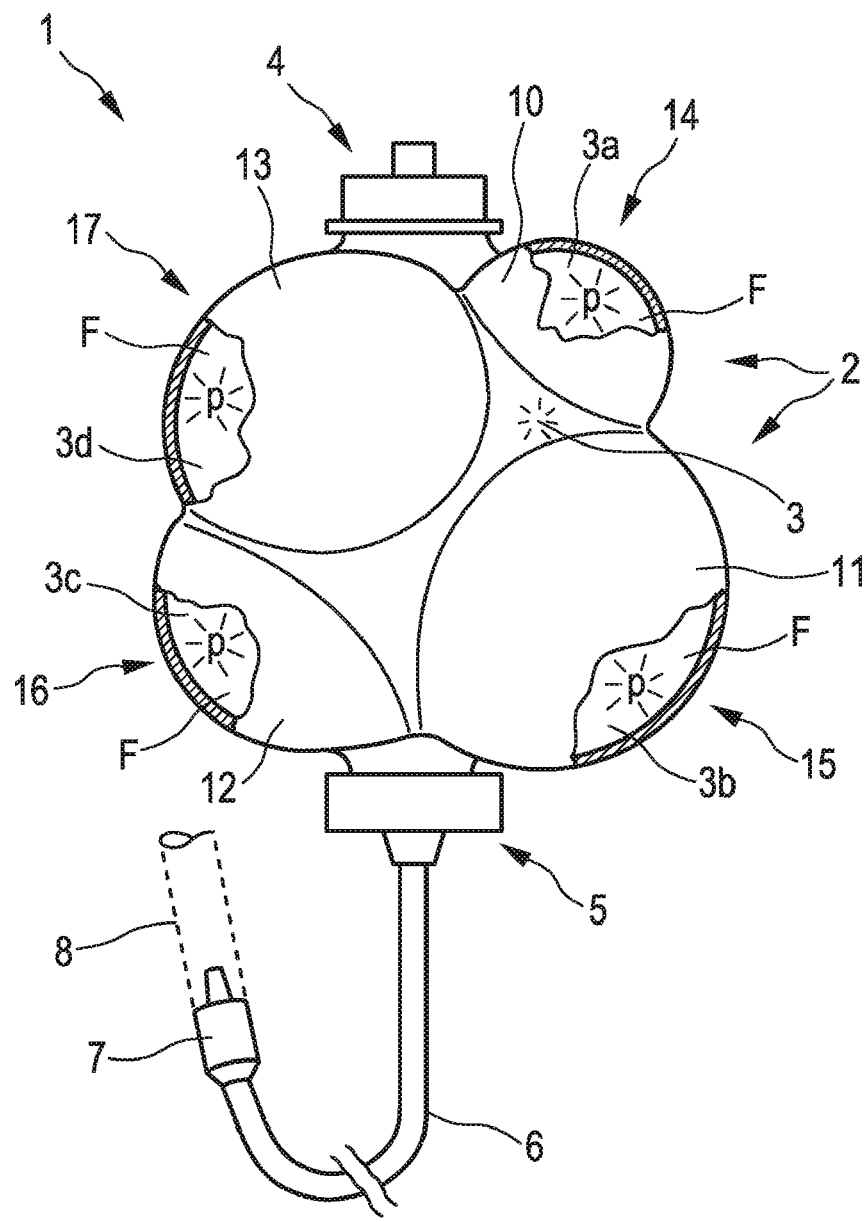
FIG. 2 shows an embodiment of a medical elastomer pump according to the invention, provided with an embodiment of an elastomeric membrane according to the invention.

FIG. 2 shows an embodiment of a medical elastomer pump 1 according to the invention, provided, in a manner corresponding to the medical elastomer pump 101 as per FIG. 1 known from the prior art, for administering a medical fluid F. This medical elastomer pump 1, in contrast to the medical elastomer pump 101 known from the prior art, has an elastomeric membrane 2 designed according to the invention. The elastomeric membrane 2 is also shown in detail by means of FIG. 3.

Figure 3:
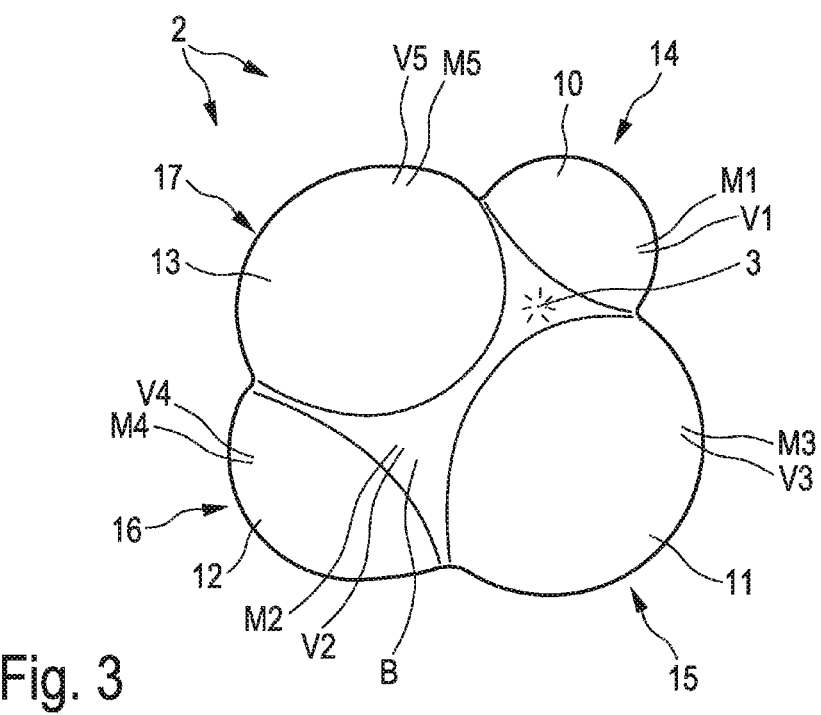
FIG. 3 shows the elastomeric membrane as per FIG. 2 in a perspective detailed view.

The elastomeric membrane 2 has a plurality of bulge portions 10, 11, 12, 13. FIGS. 2 and 3 show a filled state of the elastomeric membrane 2, in which a pump volume 3 formed by the elastomeric membrane 2 for receiving and conveying the medical fluid F is at least partially filled therewith. In this filled state, the bulge portions 10, 11, 12, 13 of the elastomeric membrane 2 curve outward in a rounded manner so as to each form a bulge 14, 15, 16, 17. These bulges 14, 15, 16, 17 each form a pump volume portion 3a, 3b, 3c, 3d of the pump volume 3 (FIG. 2).

In contrast to the elastomeric membrane 102 known from the prior art, the elastomeric membrane 2—at least in the filled state—does not approximately assume a spherical, oval or ball-shaped form. Instead, the elastomeric membrane 2 is rounded, curves outward, is swollen and/or is bulging at a plurality of locations so as to form the bulges 14, 15, 16, 17. The bulges 14, 15, 16, 17 curve outward in the radial direction with respect to wall portions of the elastomeric membrane 2 that are arranged away from the bulge portions 10, 11, 12, 13. The bulges 14, 15, 16, 17 may each in particular also be referred to as roundness, curvature, swelling, bulging or hump.

In the embodiment shown, the bulges 14, 15, 16, 17 are each in the form of a spherical calotte. Such a shape has proven to be advantageous. In an embodiment that is not shown, the bulges can be of a shape that deviates from the spherical calotte form shown here.

In an empty state of the elastomeric membrane 2 that is not shown in any more detail in the drawings, in which empty state the pump volume 3 is not filled with the medical fluid F but instead is empty, the bulges 14, 15, 16, 17 do not curve outward, or curve outward to a comparatively lesser extent.

In the present case, the elastomeric membrane 2 has a total of four bulge portions 10, 11, 12, 13 and accordingly a total of four bulges 14, 15, 16, 17 in the filled state; however, this is not mandatory. In an embodiment that is not shown, fewer than four bulge portions and therefore also fewer than four bulges may be present. In a further embodiment that is not shown, more than four bulge portions and therefore also more than four bulges may be present.

As further shown by means of FIGS. 2 and 3, the pump volume 3 delimited by the elastomeric membrane 2 comprises the individual pump volume portions 3a, 3b, 3c, 3d. The conveying pressure p that is established in the filled state is present within the entire pump volume 3 and therefore also in each one of the pump volume portions 3a, 3b, 3c, 3d. It can also be said in this respect that the pump volume portions 3a, 3b, 3c, 3d—expressed simply—form pump volumes or pumps that are virtually connected in parallel to one another.

The design according to the invention of the elastomeric membrane 2 makes it possible to achieve stabilization of the conveying pressure p via the elastic stretching of the elastomeric membrane 2 and thus a conveying rate of the medical fluid F that is as constant as possible.

The rest of the construction of the medical elastomer pump 1 essentially corresponds to the construction shown by means of FIG. 1 and known from the prior art. The medical elastomer pump 1 accordingly has a filler neck 4 and an outlet connector 5. The inlet connecter 4 and the outlet connector 5 are fluid-tightly connected to the elastomeric membrane 2 in a manner known in principle. In the configuration shown by means of FIG. 2, a hose line 6 is connected on the outlet side to the outlet connector 5, the end face of said hose line that faces away from the outlet connector 5 being provided with a fluid connector 7. The fluid connector 7 is provided with a schematically indicated patient-side patient access 8 for the purposes of fluid-conducting connection. It is evident that a throttle element corresponding to the throttle element 109 can also be provided and assigned to the hose line 6 in the case of the elastomer pump 1.

The elastomeric membrane 2 has—unlike what is suggested in FIG. 3—an inlet opening assigned to the inlet connector 4 and an outlet opening assigned to the outlet connector 5, which openings can each be incorporated into the elastomeric membrane 2 in a manner known in principle and are not illustrated in FIG. 3 for graphical reasons.

In the embodiment shown, the elastomeric membrane 2 has locally different elastic stretch properties. The elastomeric membrane 2 is elastically stretchable comparatively more easily in the region of the bulge portions 10, 11, 12, 13 than in a region B away from the bulge portions 10, 11, 12, 13 (FIG. 3). The locally different stretch properties can be caused by locally different material properties and/or by locally different dimensioning of the elastomeric membrane 2. Because the elastomeric membrane 2 is elastically stretchable comparatively more easily in the region of the bulge portions 10, 11, 12, 13, reliable and functionally correct outward curving so as to form the bulges 14, 15, 16, 17 is ensured.

In the embodiment shown, the locally different elastic stretch properties of the elastomeric membrane 2 are caused by different membrane thicknesses M1, M2, wherein a first membrane thickness M1 is provided in the region of the bulge portions 10, 11, 12, 13 and a second membrane thickness M2 is provided away from the bulge portions 10, 11, 12, 13 and thus especially in the region B. The first membrane thickness M1 is dimensioned so as to be comparatively smaller than the second membrane thickness M2. Accordingly, the elastomeric membrane 2 is elastically stretchable comparatively more easily in the region of the bulge portions 10, 11, 12, 13.

In the embodiment shown, the first membrane thickness M1 is 1.7 mm and the second membrane thickness M2 is 1.9 mm. Membrane thicknesses M1, M2 between 0.5 mm and 4 mm and preferably between 1.5 mm and 2.5 mm have proven to be advantageous in principle.

The elastomeric membrane 2 is manufactured from at least one elastomeric material. Useful for this purpose are in particular silicone in the form of silicone rubber and/or silicone elastomer, and rubber.

Regarding the locally different configuration of the stretch properties, provision is further made for the elastomeric membrane 2, more precisely: at least one elastomeric material from which the elastomeric membrane 2 has been manufactured, to be crosslinked to locally different degrees. A first degree of crosslinking V1 is provided in the region of the bulge portions 10, 11, 12, 13 and a second degree of crosslinking V2 is provided away from the bulge portions 10, 11, 12, 13 and therefore especially also in the region B. The first degree of crosslinking V1 is comparatively weaker than the second degree of crosslinking V2. This means that the elastomeric membrane 2 is elastically stretchable comparatively more easily in the region of the bulge portions 10, 11, 12, 13. A corresponding vulcanization process can be used for the crosslinking to locally different degrees. Such vulcanization processes are known as such in principle. In the present case, locally adapted vulcanization by means of high-energy radiation has proven to be particularly advantageous.

In the embodiment shown, the elastomeric membrane 2 does not have only locally different elastic stretch properties with regard to the bulge portions 10, 11, 12, 13 and the region B away from the bulge portions 10, 11, 12, 13 (FIG. 3). In addition, the bulge portions 10, 11, 12, 13 also have different elastic stretch properties. This means that the bulge portions 10, 11, 12, 13 curve outward differently under the effect of the conveying pressure p, with the result that the bulges 14, 15, 16, 17 are accordingly also different. The different formation of the bulges 14, 15, 16, 17 that can be seen with reference to FIGS. 2 and 3 is accompanied by an accordingly different volume content of the pump volume portions 3a, 3b, 3c, 3d. Expressed simply, the design of the bulge portions 10, 11, 12, 13, of the bulges 14, 15, 16, 17 and therefore of the pump volume portions 3a, 3b, 3c, 3d that differs in this respect achieves a kind of parallel circuit of different pumps. It has been found that this offers further advantages with regard to the stabilization of the conveying rate of the medical fluid F. Nevertheless, it should be stated that the bulge portions 10, 11, 12, 13 do not necessarily have to have different elastic stretch properties. Accordingly, in an embodiment that is not shown in the drawings, the bulge portions do not differ with respect to their elastic stretch properties, with the result that pump volume portions with the same volume content are achieved.

In the embodiment shown, the different elastic stretch properties of the bulge portions 10, 11, 12, 13 are achieved by different membrane thicknesses M1, M3, M4, M5. The bulge portion 10 has the first membrane thickness M1 already mentioned above. The bulge portion 11 has a third membrane thickness M3. The bulge portion 12 has a fourth membrane thickness M4. The bulge portion 13 has a fifth membrane thickness M5. The aforementioned membrane thicknesses M1, M3, M4, M5 are dimensioned differently to one another and accordingly comparatively thinner and/or thicker.

In the present case, to form the different elastic stretch properties of the bulge portions 10, 11, 12, 13, provision is additionally made of crosslinking of the elastomeric material of the elastomeric membrane 2 to differing degrees in the region of the bulge portions 10, 11, 12, 13. The first degree of crosslinking V1 already mentioned above is provided in the region of the bulge portion 10. The bulge portion 11 has a third degree of crosslinking V3. The bulge portion 12 has a fourth degree of crosslinking V4. The bulge portion 13 has a fifth degree of crosslinking V5. The aforementioned degrees of crosslinking V1, V3, V4, V5 are comparatively weaker and/or greater relative to one another.

It is evident that the above-described measures for achieving the different elastic stretch properties of the bulge portions 10, 11, 12, 13 do not necessarily have to be combined. Accordingly, in an embodiment with respect to this that is not shown, only different membrane thicknesses are provided in the region of the bulge portions, with the elastomeric material having the same degree of crosslinking in the region of the bulge portions. In a further embodiment that is not shown, the bulge portions have the same membrane thickness, with, however, different degrees of crosslinking of the elastomeric material being provided in the region of the bulge portions.

The elastomeric membrane 2 can be of single-layer or multilayer construction.

Figure 4:
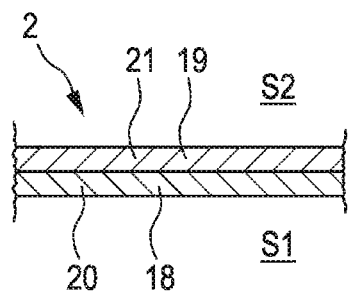
FIG. 4 shows a schematic sectional view through a membrane portion of the elastomeric membrane as per FIG. 3, which portion has been planarly unrolled.

In the embodiment shown, a multilayer membrane construction having a first membrane layer 18 and a second membrane layer 19 is provided (FIG. 4). The first membrane layer 18 is arranged on the inside in the radial direction of the pump volume 3 and, in this respect, on an interior side S1 of the elastomeric membrane 2. The second membrane layer 19 is arranged on the outside in the radial direction and thus on an exterior side S2 of the elastomeric membrane 2. In the present case, the first membrane layer 10 is manufactured from a silicone material 20. In particular, the silicone material 20 can be a silicone rubber or a silicone elastomer. In any case, the first membrane layer 18 is in direct contact with the medical fluid F in the filled state. The silicone material 20 has advantageous chemical properties in this regard. In the embodiment shown, the second membrane layer 19 is manufactured from rubber 21. In the present case, the second membrane layer 19 dominates the elastic stretch properties of the elastomeric membrane 2.

Figure 5:
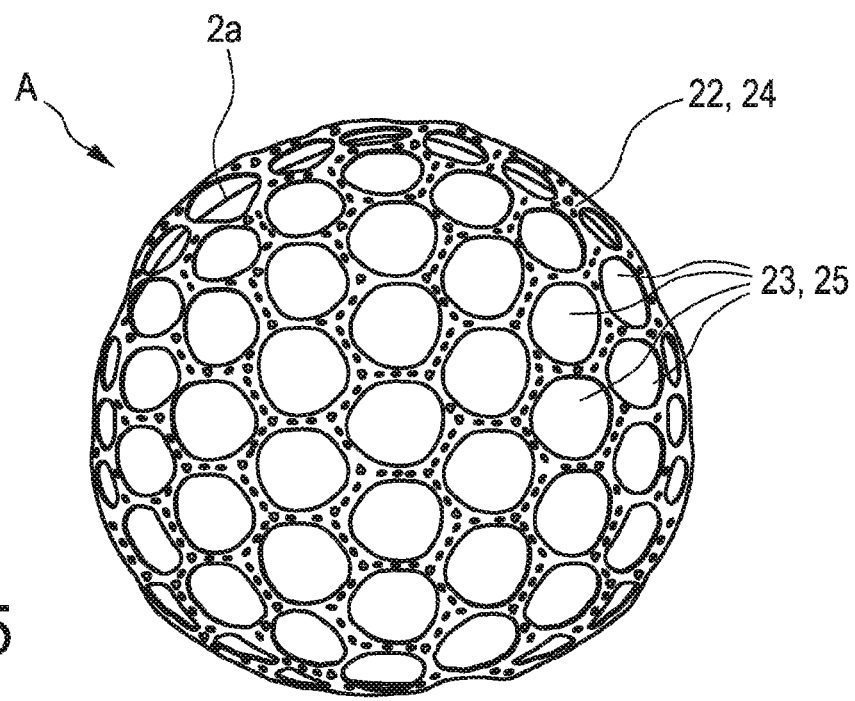
FIG. 5 shows an embodiment of a membrane arrangement according to the invention having an elastomeric membrane and a lattice structure that envelops the elastomeric membrane at least in certain portions.
Figure 7:
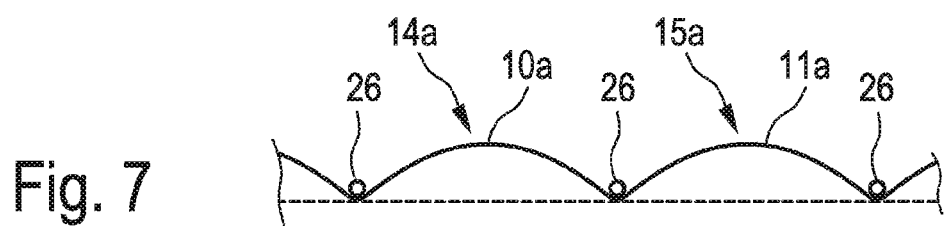
FIG. 7 shows the membrane arrangement as per FIG. 5 and depicted in accordance with FIG. 6, wherein the elastomeric membrane assumes a filled state at least partially filled with medical fluid.

FIG. 5 shows a membrane arrangement A having an elastomeric membrane 2a and a lattice structure 22. The membrane arrangement A is provided for a medical elastomer pump and can be used, for example, in place of the elastomeric membrane 2 in the case of the medical elastomer pump 1 as per FIG. 2. The elastomeric membrane 2a forms a pump volume, not denoted any further, for receiving and conveying the medical fluid F. This elastomeric membrane 2a, taken on its own, is in turn elastically stretchable in the manner of a balloon. The elastic stretchability of the elastomeric membrane 2a is, however, restricted by the lattice structure 22. The lattice structure 22 is stretch-resistant and envelops the elastomeric membrane 2a at least in certain portions. Accordingly, the exterior side S2 of the elastomeric membrane 2a is supported in the radial direction on an interior side, not denoted any further, of the lattice structure 22. The lattice structure 22 has a plurality of lattice openings 23. The elastomeric membrane 2a, at least in the filled state thereof, curves radially outward in the region of the lattice openings 23 through the lattice openings 23 so as to form in each case a bulge 14a, 14b (FIG. 7). In the embodiment shown, the lattice openings 23 are approximately hexagonal, which, however, should be understood as being purely exemplary.

In the embodiment shown by means of FIG. 5, the lattice openings 23 differ slightly. This is with regard to a shaping and/or a diameter of the lattice openings 23. In an embodiment that is not shown, these differences may be more strongly pronounced. In a further embodiment that is not shown, the lattice openings are not dimensioned differently.

The elastomeric membrane 2a, taken on its own, does not have a specific design for forming the bulges 14a, 15a. Rather, corresponding bulge portions 10a, 11a, so to speak, are only formed by interaction between the elastomeric membrane 2a and the lattice structure 22.

Since the lattice openings 23 are dimensioned differently in the embodiment shown, the bulge portions 10a, 11a are accordingly formed differently.

FIG. 5 shows the membrane arrangement A in a state in which the elastomeric membrane 2a and therefore the pump volume thereof are not, or at least not appreciably, filled with the medical fluid F. In such an empty state of the pump volume, the exterior side S2 of the elastomeric membrane at most bears loosely on the interior side of the lattice structure 22 or is even spaced apart therefrom, as illustrated by means of FIG. 6. It is only in the filled state illustrated schematically by means of FIG. 7 that the bulges 14a, 15a are formed, with the corresponding bulge portions 10a, 11a curving out in a rounded manner through the lattice openings 23. The bulges 14a, 15a are approximately in the form of a spherical calotte. Each of the bulges 14a, 15a in turn forms a pump volume portion, not denoted any further, of the pump volume. The slightly different design of the lattice openings 23 means that, as already mentioned, the bulges 14a, 15a and the respectively assigned pump volume portion—unlike what is suggested in FIG. 7—are different. A corresponding illustration in the drawings has been omitted for the sake of clarity. As a result of the different lattice openings 23, the bulge 14a can, by way of example, curve outward to a greater extent than the bulge 15a or vice versa. The same applies to the respectively assigned pump volume portion. The lattice structure 22 is stretch-resistant and thus remains in the configuration that can be seen with reference to FIG. 5 even when the elastomeric membrane 2a has been filled with the medical fluid F. In this respect, the lattice structure 22 is not elastically stretched approximately in the manner of a balloon.

Figure 6:
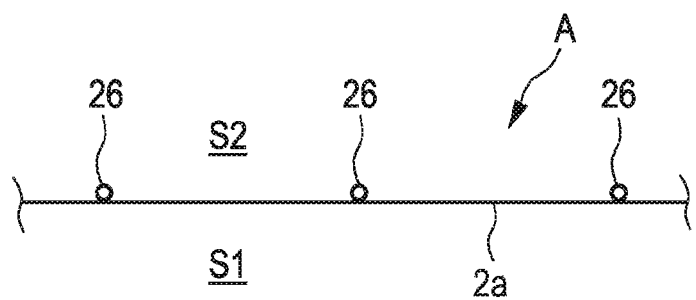
FIG. 6 shows the membrane arrangement as per FIG. 5 in a schematically highly simplified, cropped and planarly unrolled cross-sectional view, wherein the elastomeric membrane assumes an empty state.

In the embodiment shown, the lattice structure 22 is designed as a textile fabric 24. The textile fabric 24 is manufactured in the form of a coarse-meshed net, wherein the lattice openings 23 are formed by meshes 25 of the textile fabric 24. In particular, the textile fabric 24 can be warp-knitted, woven, weft-knitted or knotted and has textile strands 26 that are operatively connected to one another in this respect and form the meshes 25 or—expressed in other words—delimit the lattice openings 23 (FIGS. 6, 7).

In an embodiment that is not shown, the lattice structure is manufactured from a dimensionally stable material. In particular, the lattice structure can be manufactured from metal or plastic.

The invention claimed is:

1. An elastomeric membrane for a medical elastomer pump for conveying a medical fluid, wherein the elastomeric membrane forms a pump volume for receiving and conveying the medical fluid and is elastically stretched in a filled state of the pump volume at least partially filled with the medical fluid, as a result of which the elastically stretched elastomeric membrane exerts a conveying pressure on the pump volume so as to convey the medical fluid, the elastomeric membrane having a plurality of bulge portions that, at least in a filled state, curve outward so as to each form a respective bulge, the respective bulges each forming a pump volume portion of the pump volume.

2. The elastomeric membrane according to claim 1, further comprising locally different elastic stretch properties, wherein the elastomeric membrane is elastically stretchable comparatively more easily in a first section of the elastomeric membrane than in a second section of the elastomeric membrane, the first section being closer to the bulge portions than the second section.

3. The elastomeric membrane according to claim 1, wherein the bulge portions have different elastic stretch properties, as a result of which the respective bulges are formed differently in response to the conveying pressure.

4. The elastomeric membrane according to claim 1, further comprising locally different membrane thicknesses, wherein a first membrane thickness in a first section of the elastomeric membrane is comparatively smaller than a second membrane thickness in a second section of the elastomeric membrane, and wherein the first section is closer to the bulge portions than the second section.

5. The elastomeric membrane according to claim 1, wherein the bulge portions have different membrane thicknesses.

6. The elastomeric membrane according to claim 1, further comprising at least one elastomeric material that is crosslinked to locally differing degrees, wherein a first degree of crosslinking in a first section containing the bulge portions is comparatively weaker than a second degree of crosslinking in a second section located away from the bulge portions.

7. The elastomeric membrane according to claim 6, wherein different degrees of crosslinking are provided in the first section containing the bulge portions.

8. The elastomeric membrane according to claim 1, wherein the plurality of bulge portions comprises between 2 and 100 bulge portions.

9. The elastomeric membrane according to claim 1, further comprising a membrane thickness and/or locally different membrane thicknesses between 0.5 mm and 4 mm.

10. The elastomeric membrane according to claim 1, further comprising an at least single-layer membrane construction that has at least one first membrane layer comprising silicone.

11. The elastomeric membrane according to claim 10, wherein the at least single-layer membrane construction is a multilayer membrane construction that comprises the at least one first membrane layer and at least one second membrane layer, and wherein the at least one second membrane layer comprises rubber.

12. A membrane arrangement for a medical elastomer pump for conveying a medical fluid, the membrane arrangement comprising:
an elastomeric membrane that forms a pump volume for receiving and conveying the medical fluid and is elastically stretched in a filled state of the pump volume at least partially filled with the medical fluid, as a result of which the elastically stretched elastomeric membrane exerts a conveying pressure on the pump volume so as to convey the medical fluid, the elastomeric membrane having a plurality of bulge portions that, at least in a filled state, curve outward so as to each form a respective bulge, the respective bulges each forming a pump volume portion of the pump volume; and a lattice structure that is stretch-resistant and envelops the elastomeric membrane at least in certain portions, the elastomeric membrane being radially outwardly supported on a radially inner interior side of said lattice structure at least in the filled state, wherein the lattice structure has a plurality of lattice openings, and wherein the elastomeric membrane protrudes through the plurality of lattice openings at least in the filled state, radially curving outward so as to form the respective bulges.

13. The membrane arrangement according to claim 12, wherein the lattice openings have different dimensions.

14. The membrane arrangement according to claim 12, wherein the lattice structure is a textile fabric, and the lattice openings are formed by meshes of the textile fabric.

15. A medical elastomer pump for conveying a medical fluid, the medical elastomer pump comprising:

an elastomeric membrane that forms a pump volume for receiving and conveying the medical fluid and is elastically stretched in a filled state of the pump volume at least partially filled with the medical fluid, as a result of which the elastically stretched elastomeric membrane exerts a conveying pressure on the pump volume so as to convey the medical fluid, the elastomeric membrane having a plurality of bulge portions that, at least in a filled state, curve outward so as to each form a respective bulge, the respective bulges each forming a pump volume portion of the pump volume;

an inlet connector fluid-tightly connected to the elastomeric membrane:

an outlet connector fluid-tightly connected to the elastomeric membrane; and a lattice structure that is stretch-resistant and envelops the elastomeric membrane at least in certain portions, wherein the elastomeric membrane is radially outwardly supported on a radially inner interior side of said lattice structure at least in the filled state, wherein the lattice structure has a plurality of lattice openings, and wherein the elastomeric membrane protrudes through the plurality of lattice openings at least in the filled state, radially curving outward so as to form the respective bulges.

* * * * *